(12) United States Patent
Auxerre et al.

(10) Patent No.: US 6,263,934 B1
(45) Date of Patent: Jul. 24, 2001

(54) TIRE TREAD COMPRISING INCISIONS BOUNDING RUBBER STUDS

(75) Inventors: Pascal Auxerre, Royat; José Merino Lopez, Riom; Bertrand Garnier de Labareyre, Chamalieres, all of (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/335,659

(22) Filed: Jun. 18, 1999

(30) Foreign Application Priority Data

Jul. 3, 1998 (FR) .................................................. 98 08652

(51) Int. Cl.$^7$ ............................. B60C 11/03; B60C 11/12; B60C 11/13; B60C 11/16; B60C 109/00
(52) U.S. Cl. ............................... 152/209.17; 152/209.22; 152/209.23; 152/210; 152/211; 152/DIG. 3
(58) Field of Search ........................ 152/209.17, 209.18, 152/209.21, 209.22, 209.23, DIG. 3, 210, 211

(56) References Cited

U.S. PATENT DOCUMENTS

| | | | | |
|---|---|---|---|---|
| 1,411,671 | * | 4/1922 | Schrank ........................... | 152/209.23 |
| 2,100,084 | * | 11/1937 | McNeill ........................... | 152/DIG. 3 |
| 2,152,883 | * | 4/1939 | Eudy ............................... | 152/DIG. 3 |
| 2,267,406 | * | 12/1941 | Krusemark ...................... | 152/DIG. 3 |
| 2,339,558 | * | 1/1944 | Hale ................................ | 152/DIG. 3 |
| 2,655,971 | * | 10/1953 | Gross .............................. | 152/209.17 |
| 2,690,202 | | 9/1954 | Walsh . | |
| 2,771,114 | * | 11/1956 | Labernie ......................... | 152/209.17 |
| 2,938,560 | | 5/1960 | Wallace et al. . | |
| 5,022,448 | * | 6/1991 | Ochiai ............................. | 152/209.22 |
| 6,116,310 | * | 9/2000 | Shinohara ....................... | 152/DIG. 3 |

FOREIGN PATENT DOCUMENTS

| | | | | |
|---|---|---|---|---|
| 0664230 | | 7/1995 | (EP) . | |
| 858875 | * | 8/1998 | (EP) .............................. | 152/DIG. 3 |
| 2759323 | | 8/1998 | (FR) . | |
| 502992 | | 3/1939 | (GB) . | |
| 515129 | * | 11/1939 | (GB) .............................. | 152/DIG. 3 |
| 2061837 | * | 5/1981 | (GB) .............................. | 152/209.17 |
| 63-291704 | * | 11/1988 | (JP) ............................... | 152/209.18 |
| 2-310108 | * | 12/1990 | (JP) ............................... | 152/209.21 |
| 3-112705 | * | 5/1991 | (JP) ............................... | 152/209.18 |
| 5-58118 | * | 3/1993 | (JP) ............................... | 152/209.21 |

OTHER PUBLICATIONS

Abstract for Europe 664230.*
Abstract for French 2759323.*
Database WPI, Section CH, Week 9033, Derwent Publications Ltd., London, GB; Class A95, AN 86–055660, XP–002096304 & JP 61016112 A, (Sumitomo Rubber Ind. Ltd), Jan. 09, 1986, & AU8544455.

* cited by examiner

Primary Examiner—Steven D. Maki
(74) Attorney, Agent, or Firm—Baker Botts L.L.P.

(57) ABSTRACT

A tread is provided with at least one rubber stud of orientation XX' perpendicular or inclined with respect to the tread surface. The rubber stud has a side wall bounded by at least one incision and an outer end wall. The stud is joined to the tread at its base (the rubber stud part located farthest inward on the tread) and by at least one rubber connecting element joining the side wall of said stud to the rest of the tread. The projected length, on the tread surface in new condition and in the direction XX', of the principal geometrical lines of the surfaces of intersection of all the connecting elements of each rubber stud, represents at least 80 percent of the contour perimeter, measured on the same surface, of each rubber stud. Preferably, the principal geometrical lines bounding the surfaces of intersection of the connecting elements are in the form of helixes around XX', and the projected length of said lines is equal or close to 100 percent of the perimeter.

11 Claims, 3 Drawing Sheets

TIRE TREAD COMPRISING INCISIONS BOUNDING RUBBER STUDS

BACKGROUND OF THE INVENTION

The invention relates to tire treads, and in particular to a structure of a new incision geometry, imparting improved properties of adherence to said treads while postponing the occurrence of irregular wear.

The invention relates to treads intended for the fabrication of new tires or to the retreading of tires, and in particular to tread structures for said tires, comprising a large number of cut-outs in the form of grooves and/or incisions. By incision is meant, in this description, a cut-out of width less than or equal to 2 mm, while a groove is a cut-out of width greater than 2 mm.

It is known, for example in U.S. Pat. No. 2,100,084, that incisions may be made whose trace on the tread surface of a tire is of closed circular shape, providing active edges in all directions tangent to the tread surface. Each such incision bounds and isolates a rubber element (of small size compared to the tread width) joined to the tread at its base only. This rubber element, under the action of forces of rolling contact with the ground, has a tendency to deform both in shear and in bending (stresses tangential to the surface of the isolated element coming into contact with the ground) and in compression under the load supported by the tire. Considering the size of the isolated elements and of the stresses to which they are subjected, it may happen that these elements are torn away from the rolling tread.

To remedy this drawback, it is known, for example in U.S. Pat. No. 2,938,560, that the walls of the isolated element may be provided with rubber connecting elements joining said element to the rest of the tread. U.S. Pat. No. 2,938,560 describes a tread provided with a structure made up of a plurality of wave-shaped incisions, said incisions being arranged under as to isolate rubber studs; these studs are joined to the tread by four supports arranged on the tread surface, each support rising beneath the rolling surface in new condition and extending in a direction perpendicular to said surface, as far as the full depth of said incisions. By stud is meant in the description a small isolate rubber element.

However, such incisions may lead to irregular wear, that is, wear occurring preferentially in certain areas of the tread and amplified in rolling so as to lead usually to premature discard of the tire; in some cases, the edges formed by the incisions in the tread may be preferential locations of initiation of such wear, especially in applications having a large tread thickness (for example in tires for heavy loads).

Furthermore, the incisions proposed in U.S. Pat. No. 2,938,560 have another disadvantage relating to the entry of pebbles into the tread.

It often happens that the ground on which the tire rolls is covered with gravel or other objects that may get into the incisions. In many cases, these introduced objects are ejected under the action of centrifugal force due to rotation of the tire; all the same, it will happen that some of these foreign bodies remain imprisoned in said incisions and may travel towards the bottom of the incisions until they attack the tire structure. It is likewise possible that these included objects may cut the rubber studs bounded by each closed-curve incision, with the result that the rubber will tear, forming holes in the tread and thus increasing the likelihood of penetration by foreign bodies.

SUMMARY OF THE INVENTION

To avoid both the occurrence of abnormal wear near edges formed by said incisions of closed or nearly closed outline on the contact surface of a tread, and reduce the likelihood of introduction of foreign matter into the incision, the invention proposes a tire tread provided with a rolling surface and a plurality of incisions opening upon said surface. Wear is termed abnormal when it occurs locally at certain places in the structure of a tread and not uniformly over the structure as a whole.

Each incision is defined by the space bounded principally between two main walls facing each other, said walls being perpendicular or oblique with respect to the rolling surface.

The tread is provided with at least one rubber stud, of principal orientation XX' perpendicular or inclined with respect to the rolling surface, bounded by at least one incision, said stud comprising an outer end wall and a side wall perpendicular or inclined with respect to the rolling surface. The end wall, corresponding to the stud wall located nearest the rolling surface, is intended to come into contact with the ground when the tread equips a tire rolling over the ground.

The stud thus bounded is joined to the tread by its base (portion of stud located farthest inside the said tread) and by at least one rubber connecting element joining the side wall of said stud to the rest of the tread. The tread according to the invention is characterized in that:

Each connecting element of each rubber stud has a surface of intersection, bounded by two principal geometrical lines of like course, with the side walls of said rubber stud.

The projected length, on the rolling surface of the tread in new condition and in the direction XX' of the principal geometrical lines of the surfaces of intersection of all the connecting elements of each rubber stud represents at least 80 percent of the contour perimeter of each rubber stud measured on the same surface.

The sum of the lengths of the intersections, with any surface substantially parallel to the rolling surface of the tread in new condition and located inside of the said tread, of the surfaces of intersection of all the connecting elements of one and the same rubber stud, represents at most 50 percent of the contour perimeter of said rubber stud measured on the same said surface substantially parallel to the rolling surface of the tread in new condition and located inside of the tread.

By mean direction XX' of a rubber stud bounded by an incision is meant the direction connecting the geometric center of gravity of the base of said stud to the center of gravity of the end wall (this direction makes an angle of 90 degrees with said surface when the incision bounding that element is perpendicular to that surface).

A connecting or bridging element is defined as a rubber portion projecting from the side wall of an isolated rubber stud, said side wall forming one of the principal walls of an incision; said connecting element is moreover joined to the other principal wall of the incision bounding said rubber stud. Each connecting element, with the side wall of the stud, has a surface of intersection geometrically defined by a contour having two principal geometrical lines with traces fairly close together.

By a similar trace is meant that the principal geometrical lines bounding a surface of intersection of a connecting element have geometrical shapes virtually superposable over much of their extent.

Preferably, said traces are substantially parallel, which is to say that the mean distances between said lines are nearly constant. The distance between two geometrical lines of one and the same surface of intersection of a connecting element of a stud is measured on said lateral surface of said stud as the length of the curve obtained by intersection of said surface of intersection with a virtual surface parallel to the rolling surface of the tread in new condition.

The projected length corresponds to the length measured on the contour of the rubber stud, corresponding to the projections of the principal geometrical lines of the totality of surfaces of intersection of the connecting elements of said stud; if two principal geometrical lines have the same projection, then the projected length is equal to the length of that projection. By convention, the projected length is at most equal to the contour perimeter of the stud, and in this latter case, to each point of the said contour there corresponds at least one point of at least one principal geometrical line.

A tread configuration comprising incisions bounding rubber studs according to the invention has the advantage of having a long length of active rubber edges in contact with the ground (to wit for different wear levels of said tread) owing to the presence of a larger number of incisions and rubber studs while obtaining satisfactory protection vis-à-vis penetration of foreign bodies owing to the presence of rubber connecting elements, preventing said bodies from entering and remaining in the incision, inasmuch as the connecting element(s) of one and the same stud cover(s) a more or less large portion of the contour of said stud.

Preferably, an optimum effect is achieved when the projected length, on the tread surface in new condition and in the direction XX', of the principal geometrical lines of the surfaces of intersection of all the connecting elements of a plurality of rubber studs represents 100 percent of the contour perimeter of said rubber stud measured on the same surface.

In addition, the connecting elements, of elastic rubber, will exert a mechanical rejecting action on any foreign body that may nevertheless enter the incision.

The tread structure according to the invention serves to avoid the occurrence of irregular wear arising at certain rubber edges, since the geometry of the connecting element or elements of one and the same stud causes the position of the intersections of said connecting elements with the rolling surface to change regularly as the tread wears. When a tread according to the invention equips a tire, what results, as the latter wears, is a regular variation of the distribution of tangential stresses exerted by the ground on the tire in contact between the tire and the ground.

It may be provided that from one stud to another of its neighbors on the same tread, the locations of the connecting elements are different, so that regardless of the wear on the tire, there will always be a like proportion of active edges in a given direction (circumferential or transverse).

Preferably, and to maintain a long edge length regardless of the wear level of a tread, the connecting elements have surfaces of intersection at the side walls, characterized in that the width of said surfaces of intersection does not vary, on the average, by more than 50 percent of the mean width of the connecting element, considered over the entire extent of said element; said width being equal to the length of the curve resulting from the intersection of said surface of intersection of said connecting element with a surface parallel to the rolling surface of the tread in new condition.

Further, and to obtain a junction of each stud with the tread during much of the service life of the tread, it is preferable that the connecting elements extend in depth direction from the rolling surface at least up to 50 percent of the depth of the incision bounding said stud, so as to provide the effects of the invention during the greater part of the service of said tread.

Thus, the connecting elements will remain sufficiently effective to prevent the penetration of objects into the incision and stiffen the rubber stud, while maintaining a long length of active edge regardless of the wear level of the tread.

To provide a better understanding of the invention and its advantages, some embodiments of the invention will now be described with reference to the drawings.

DESCRIPTION OF PREFERRED EMBODIMENTS

Figure 1:
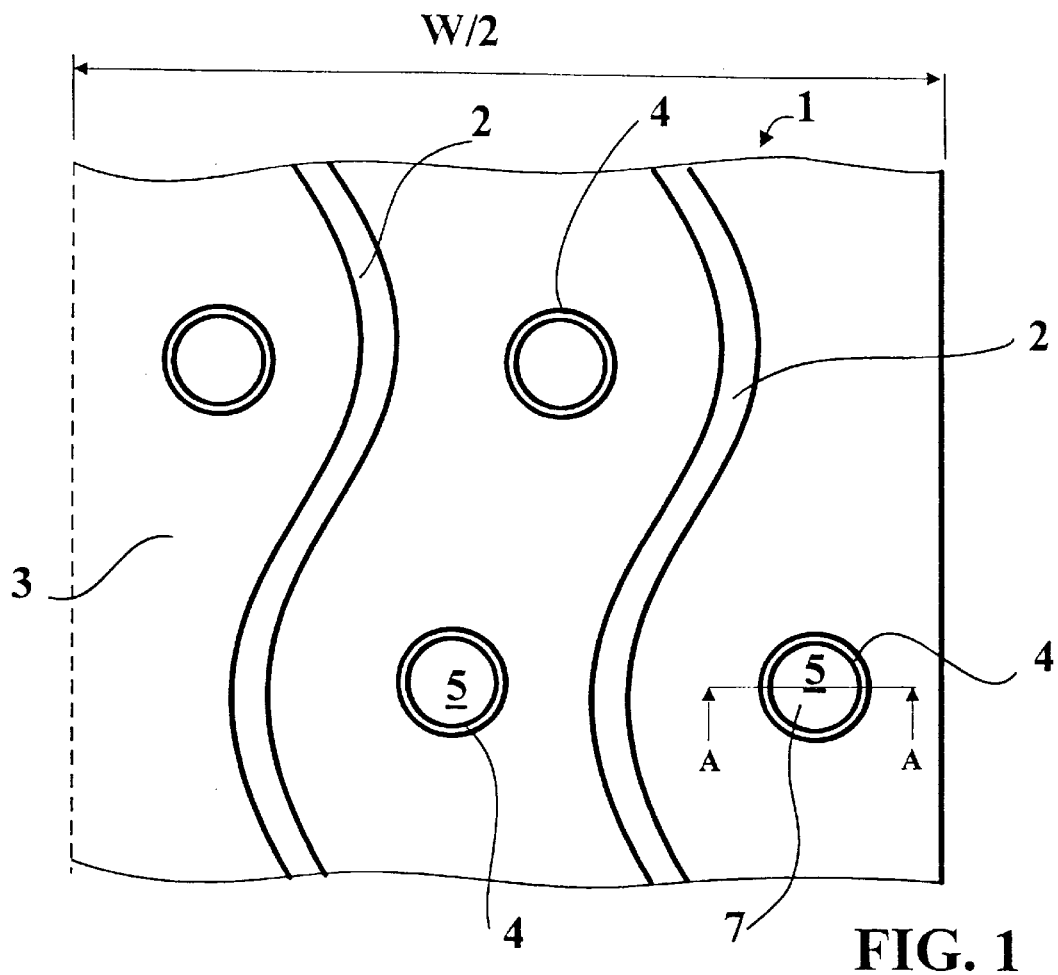
FIG. 1 shows a portion of a tire tread provided with a plurality of incisions defining rubber studs joined to said tread by at least one connecting element.

FIG. 1 shows a portion of half of a tire tread 1, said tread having a width W and a thickness E measured in new condition as the distance between the rolling surface 3 intended to come into contact with the ground and an inner surface intended to be applied to the radially outer surface of a tire blank.

The tread 1 according to the invention is provided with grooves 2 oriented in circumferential direction and a plurality of incisions 4. Said incisions 4, of depth less than or equal to the thickness E of the tread, are virtually closed upon themselves to bound and define the rubber studs 5 from the rest of the tread. In the case shown, the traces, on the rolling surface of the new tire, of the incisions 4 bounding the rubber studs 5 are circular in shape (but of course, what is to be described may apply to different shapes: oval, rectangular, etc.).

Figure 2:
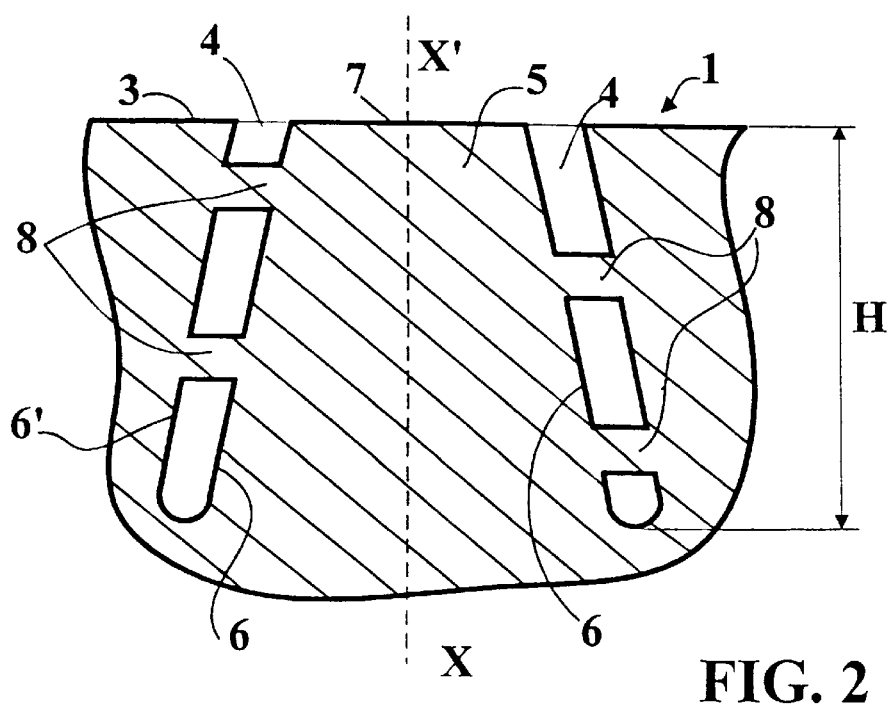
FIG. 2 shows the tread of FIG. 1 at a section A—A taken across one of the rubber studs provided with a connecting element.

A transverse section of a rubber stud 5 at A—A is shown in FIG. 2. The incision 4 opening at the rolling surface 3 in new condition are formed by the space between two rubber walls 6 and 6' and extending into the tread to a depth H, one of said walls constituting the side wall 6 of the rubber stud 5, having the shape of a truncated cone. The rubber stud 5 has an axis of symmetry XX', perpendicular in this case to the rolling surface 3 (though of course the axis XX' might be inclined at an angle different from zero to the perpendicular to the rolling surface 3).

Further, the side wall 6 of the rubber stud 5 is joined to the opposed wall 6' on the tread by a single connecting element 8 starting below the rolling surface 3 of the new tire and winding helically around the axis XX'. This connecting element 8 does not extend to the bottom of the incision 4 of depth H, in order not to divide the incision 4 into two parts.

The outer end wall 7 of the rubber stud 5, in the example described, is at the same level as the rolling surface 3 in new condition, but it may be of interest to provide for this wall to be offset radially either outward or inward from the said rolling surface 3. Preferably, the surface of the end wall 7 is located slightly below the rolling surface 3 in initial condition; gradual wear of the tread will maintain this slight offset throughout the service life of the tread.

Figure 3:
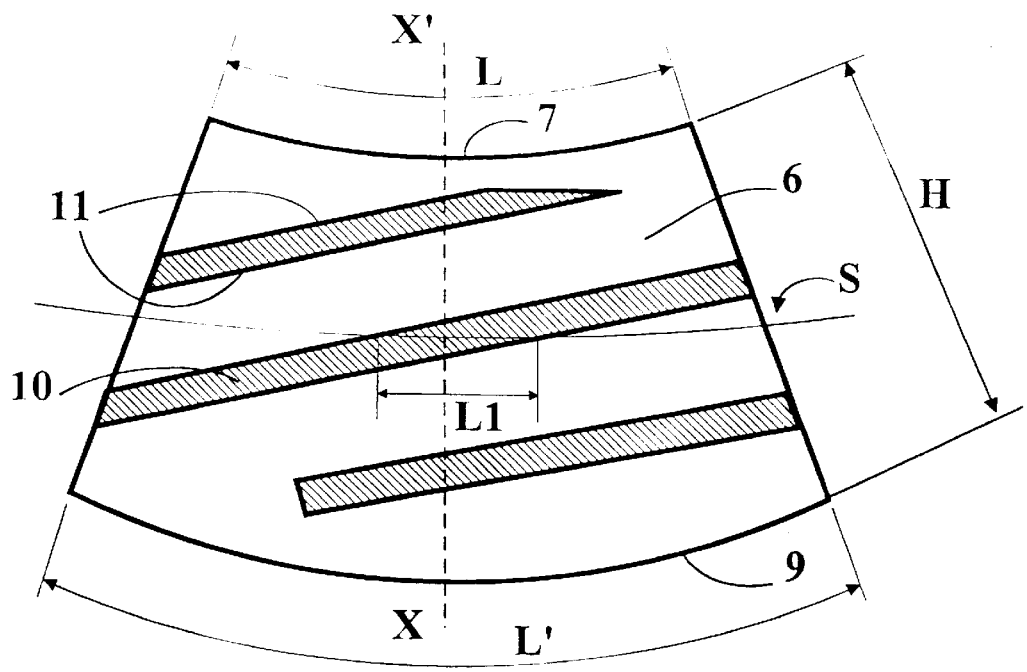
FIG. 3 shows an elevation of the whole of the side wall of the rubber stud of the tread shown in FIG. 2, said stud being joined to the tread by a connecting element coiled or spiraled around said stud.

FIG. 3 shows a schematic elevation of the side wall surface 6 of the rubber stud 5 shown in FIG. 2. The width L corresponds to the contour perimeter of the end wall 7 of the stud, while the width L' corresponds to the contour perimeter of the stud in its portion forming the base 9 of the stud. In this figure, the surface of intersection 10 of the single connecting element 8 with the side wall surface 6 is bounded by two principal geometrical straight lines 11 parallel to each other in said FIG. 3. This surface 10 starts beneath the rolling surface and extends to the neighborhood of the base 9 of the stud 5, but without reaching said base. When the stud is intersected by a virtual surface (whose trace is shown in FIG. 3 by a curved line marked S) parallel to the initial rolling surface, the length L1 of intersection of the surface of intersection 10 with said virtual surface is much less than the perimeter of said stud measured on said virtual surface of section.

The projections of the principal lines 11 on the rolling surface wholly cover the contour of the end wall of the stud.

Thus, the edge length formed by the incision opening onto the rolling surface is optimized regardless of the level of wear, while the connecting element prevents any introduction of a foreign body into the incision 4 bounding the stud 5.

The stud described above has the shape of a truncated cone whose base of smaller diameter is located on the rolling surface of the new tire, but it is likewise possible to do the contrary, or else to adopt any cylindrical shape, the axis XX' representing the axis around which said shape is constructed.

Figure 4:
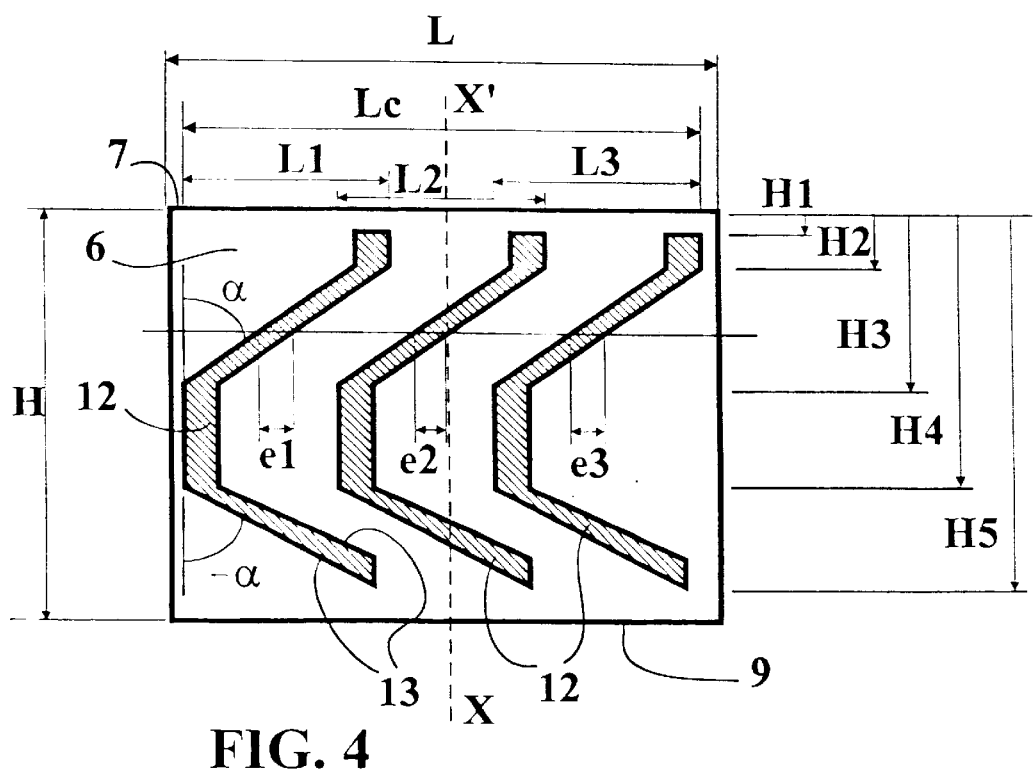
FIG. 4, in a view similar to that of FIG. 3, shows a modified geometry of a rubber stud of cylindrical shape, comprising three connecting elements.

In the version shown in FIG. 4, the rubber stud has the shape of a circular cylinder. More specifically, FIG. 4 shows an elevation of a side wall 6 of a rubber stud provided on said surface with three connecting elements whose surfaces of intersection 12 with the side wall 6 have the shapes about to be described. Each surface of intersection 12 is bounded by two geometrical lines 13 substantially parallel to each other. In this FIG. 4, the lines 13 begin from a depth H1 beneath the surface of the outer wall 7 and extend in the direction XX' to a depth H2; then, they extend in a straight portion making an angle a with the direction XX' to a depth H3; then they extend in a straight-line portion from H3 to H4, ending in a straight-line portion inclined at an angle $-\alpha$ to the direction XX' as far as a depth H5 slightly less than the depth H of the incision bounding the stud in question.

In the modification described and in the view shown in FIG. 4, the projections, parallel to the direction XX' onto the initial rolling surface, of the geometrical lines 13 bounding the surfaces of intersection of the three connecting elements define segments of lengths L1, L2, L3, partially overlapping. The projected lengths of the said three projections is equal to the length Lc, measuring, on the contour of the end wall 7, the distance between the points of the most distant projections, and representing the length on the contour of the stud affected by at least the projection of a principal geometrical line. This projected length Lc is greater than 90 percent of the perimeter L of the contour of the end wall 7 of the stud.

This modification optimizes the effect of protection of the bottom of the incision, since, for different levels of wear of the tread, the projected length remains virtually unchanged (thus, the bottom of the incision bounding the rubber stud is protected by the presence of the connecting elements at least up to half-wear of the said tread).

A modification of the tread according to the invention consists in forming, within said tread, at least one rubber stud of mean axis XX' bounded by at least one incision, said stud comprising a side wall encircling said stud around XX' and limited by a stud end wall visible from the outside of said tread, said stud encircling at least one other rubber stud bounded by an incision opening upon said end surface. This modification serves to substantially increase the number of rubber edges.

Figure 5:
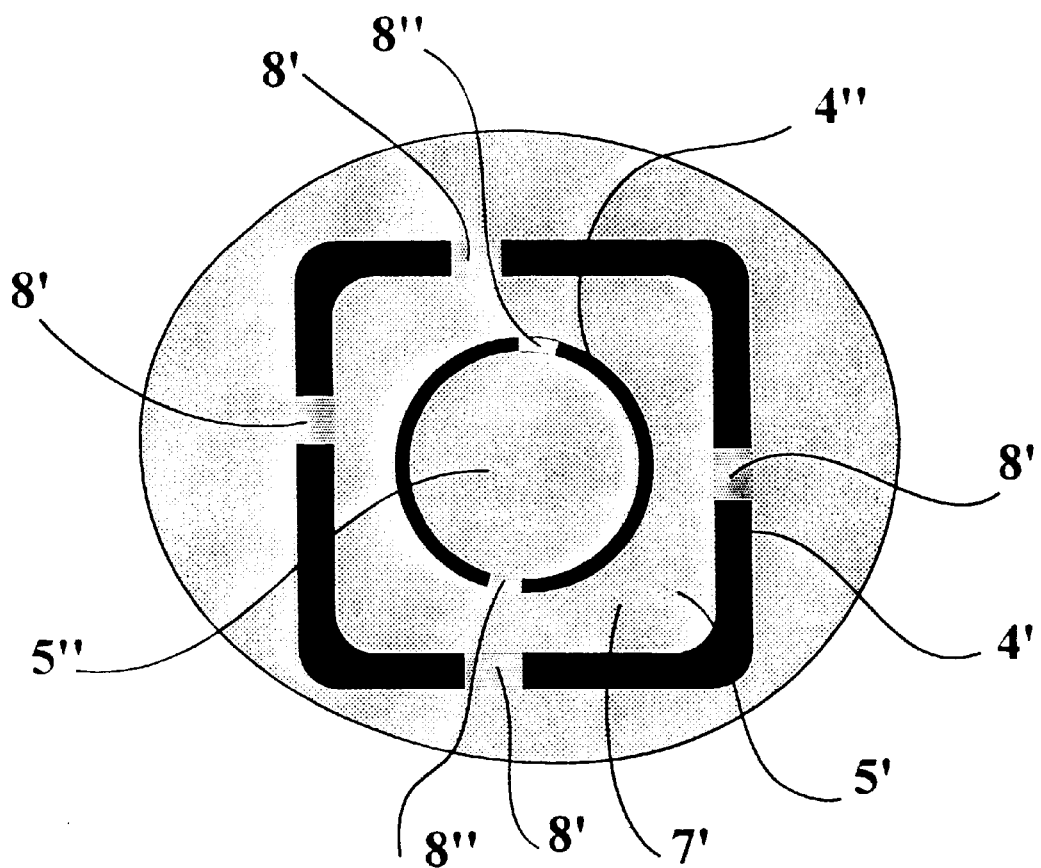
FIG. 5 shows the traces, on a rolling surface of a tread, of two incisions each bounding a rubber stud, one of the studs being formed inside the other stud.

An example corresponding to this modification is shown in FIG. 5, showing a portion of the rolling surface 3 in new condition (seen from the outside). A first rubber stud 5' whose contour of the end wall 7' is square in shape is bounded by an incision 4'. Inside of this first stud 5', a second incision 4" is provided, whose trace seen in this figure is of circular shape to bound a second rubber stud 5". Further, the first stud 5' is joined to the rest of the tread by four connecting elements rising on the rolling surface 3, their traces 8' being visible in this figure. The said four connecting elements are arranged so as to wind around the stud 5', all in the same direction (positive by convention). The second stud 5", formed inside the first, is joined to the first stud 5' by two connecting elements likewise opening onto the rolling surface (traces 8"); said two elements wind preferably around the second stud 5" in a direction opposed to the positive direction defined for the connecting elements of the first stud, for the purpose of limiting the torsion of each stud under the crushing action in contact with the ground.

What has been described for a first stud within which a second stud is formed may easily be extended to the cases of a rubber stud including a plurality of rubber studs of any geometry.

Other modifications may readily be conceived, in which connecting elements may or may not open onto the rolling surface of the new tire, that is, open onto the rolling surface so as to be flush with the said surface.

In the present description, a tread according to the invention may be used as part of the structure of a tire or as part of the structure of the tread of a caterpillar belt.

The several modifications of a tread according to the invention as described may be built, for example, by the following procedure:

Form an interlay of paperboard (or other suitable material) to be incorporated in the crude rubber tread, before molding and vulcanizing, to form an incision of closed contour bounding a rubber stud;

Make openings in the interlay, said openings being intended to let rubber through so as to form the connecting elements;

After molding and vulcanizing of the tread, the interlay may be left in place, to be gradually eliminated by contact with the roadway; alternatively, it may be removed.

We claim:

1. A tire tread having a rolling surface and comprising a plurality of incisions opening onto said surface, each incision being defined by a space bounded chiefly between two principal walls facing each other, said walls being perpendicular or oblique with respect to the rolling surface, at least one rubber stud of mean axis XX' bounded by at least one incision, said stud being defined by a side wall encircling said stud around XX' and being bounded by an outer wall of the stud, visible from the outside of said tread, said side wall being isolated from the tread except for at least one rubber connecting element, each connecting element of each rubber stud having, with the side wall of said rubber stud, a surface of intersection bounded by two principal geometrical lines, the tread being characterized in that:

the projected length, onto the rolling surface of the tread in new condition and in the direction XX', of the principal geometrical lines of the surfaces of intersection of all the connecting elements of one and the same rubber stud, represents at least 80 percent of the perimeter of the contour of each rubber stud, measured on the same surface;

the sum of the lengths of the intersections with any surface substantially parallel to the rolling surface of the tread in new condition and located inside of said tread, of the surfaces of intersection of all the connecting elements of one and the same rubber stud, represents at most 50 percent of the contour perimeter of said rubber stud, measured on the same surface.

2. A tread according to claim 1, in which at least one of the rubber studs is of generally cylindrical shape with mean axis XX'.

3. A tread according to claim 2, in which variations in width of the surface of intersection of each connecting element of a rubber stud do not vary by more than 50 percent of the mean width of said connecting element over the entire extent of said element, said width being equal to the length of the curve obtained by intersection of said surface of intersection with a surface parallel to the rolling surface of the tread in new condition.

4. A tread according to claim 3, in which at least one rubber stud is provided with at least one connecting element whose surface of intersection with the side wall of said stud is bounded by two principal geometrical lines, each of said geometrical lines making, at least in part, an angle α substantially constant and different from 0° with the direction XX'.

5. A tread according to claim 4, in which at least one rubber stud is provided with at least two connecting elements whose surfaces of intersection with the side wall of said stud are bounded by principal geometrical lines parallel or virtually parallel to each other.

6. A tread according to claim 1, in which the projected length, onto the rolling surface of the tread in new condition and in the direction XX', of principal geometrical lines of the surfaces of intersection of all the connecting elements of one and the same rubber stud is equal to the contour perimeter of said rubber stud.

7. A tire tread having a rolling surface and comprising a plurality of incisions opening upon said surface, each incision being defined by a space bounded principally between two principal walls facing each other, said walls being perpendicular or oblique with respect to the rolling surface, at least one rubber stud, of mean axis XX', defined by at least one incision, said stud being bounded by a side wall and an end wall visible from the outside of said tread, said stud encircling at least one other rubber stud bounded by an incision opening upon said end wall, the tread being characterized in that:

the side wall of the stud encircling the other stud(s) is isolated from the tread except for at least one rubber connecting element;

each of the connecting elements has a surface of intersection, with the side wall of said rubber stud, bounded by two principal geometrical lines having generally parallel traces;

the projected length, on the rolling surface of the tread in new condition and in the direction XX', of the principal geometrical lines of the surfaces of intersection of all the connecting elements of one and the same rubber stud represents at least 80 percent of the contour perimeter of each rubber stud, measured on the same surface;

the sum of the lengths of the intersections, with any surface parallel to the rolling surface of the tread in new condition and located inside of said tread, of the surfaces of intersection of all the connecting elements of the said rubber stud, represents at most 50 percent of the contour perimeter of said rubber stud measured on the same surface.

8. A tread according to claim 7, in which each rubber stud encircled by another rubber stud is provided on its lateral surface with at least one connecting bridge element joining said studs to each other, the surface of intersection of said studs with the side wall of the stud encircled by another stud being bounded by two principal geometrical lines substantially parallel to each other, the tangents to said lines making a substantially constant angle, different from zero, with the axis XX', at least over a large portion of the rubber stud.

9. A tread according to claim 8, in which each connecting element of a first rubber stud encircling a second rubber stud forms, at least partially around said first stud, a helix coiling around the axis XX' in a first direction, while each connecting element joining said second stud located inside the first stud forms, at least partially around said second stud, a helix winding in a direction opposed to the first direction.

10. A tread according to claim 7, in which the projected length, onto the rolling surface of the tread in new condition and in the direction XX', of the principal geometrical lines of the surfaces of intersection of all the connecting elements of one and the same rubber stud is equal to the contour perimeter of said rubber stud.

11. A tire having a tread as defined according to claim 1.

* * * * *